(12) United States Patent
Lock et al.

(10) Patent No.: US 10,570,671 B2
(45) Date of Patent: Feb. 25, 2020

(54) CRANE-FREE WALKING MPD SYSTEM

(71) Applicant: BEYOND ENERGY SERVICES & TECHNOLOGY CORPORATION, Clairmont (CA)

(72) Inventors: Jason Lock, Alberta, CA (US); Ron Green, Calgary (CA)

(73) Assignee: BEYOND ENERGY SERVICES & TECHNOLOGY CENTER, Clairmont (CA)

(*) Notice: Subject to any disclaimer, the term of this patent is extended or adjusted under 35 U.S.C. 154(b) by 153 days.

(21) Appl. No.: 15/685,733

(22) Filed: Aug. 24, 2017

(65) Prior Publication Data

US 2018/0058150 A1 Mar. 1, 2018

(30) Foreign Application Priority Data

Aug. 30, 2016 (CA) .................................... 2940434

(51) Int. Cl.
*E21B 15/00* (2006.01)
*B62D 57/028* (2006.01)
*E21B 21/08* (2006.01)

(52) U.S. Cl.
CPC .......... *E21B 15/003* (2013.01); *B62D 57/028* (2013.01); *E21B 21/08* (2013.01)

(58) Field of Classification Search
CPC ...... E21B 15/003; E21B 21/08; B62D 57/028

USPC .......................................................... 180/8.3
See application file for complete search history.

(56) References Cited

U.S. PATENT DOCUMENTS

| 8,051,930 B1* | 11/2011 | Barnes ................. B62D 57/028 180/8.3 |
| 9,132,871 B2* | 9/2015 | Crisp ...................... B62D 57/02 |
| 10,094,137 B2* | 10/2018 | Reddy ................... E21B 15/003 |

FOREIGN PATENT DOCUMENTS

CA 2977670 A1 2/2018

OTHER PUBLICATIONS

Canadian Office Action dated Aug. 7, 2019 in CA Application No. 2,977,670, 3 pages.

* cited by examiner

*Primary Examiner* — Kevin Hurley
*Assistant Examiner* — Felicia L. Brittman
(74) *Attorney, Agent, or Firm* — Berg Hill Greenleaf Ruscitti LLP

(57) ABSTRACT

A relocatable Managed Pressure Drilling system adapted to be operatively connected to an oil rig and comprising: a base; a tank secured to the base and adapted to contain gases used in Managed Pressure Drilling operations; optionally, a manifold secured to the base and operatively connected to the tank and adapted for use in Managed Pressure Drilling operations when connected to an oil rig; wherein said base is adapted to move from a first location to a second location on an oilfield without the use of a crane or picker.

8 Claims, 4 Drawing Sheets

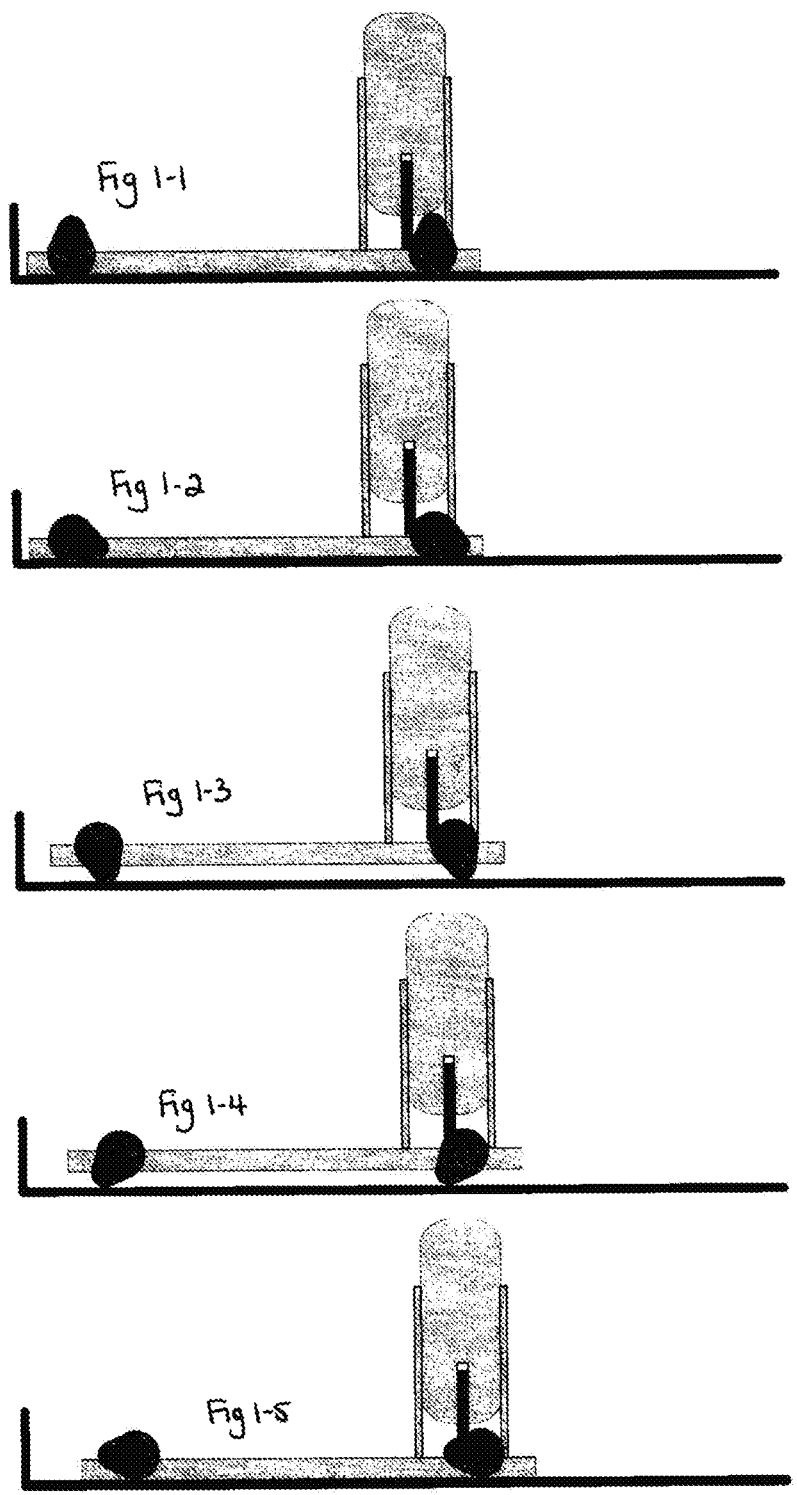

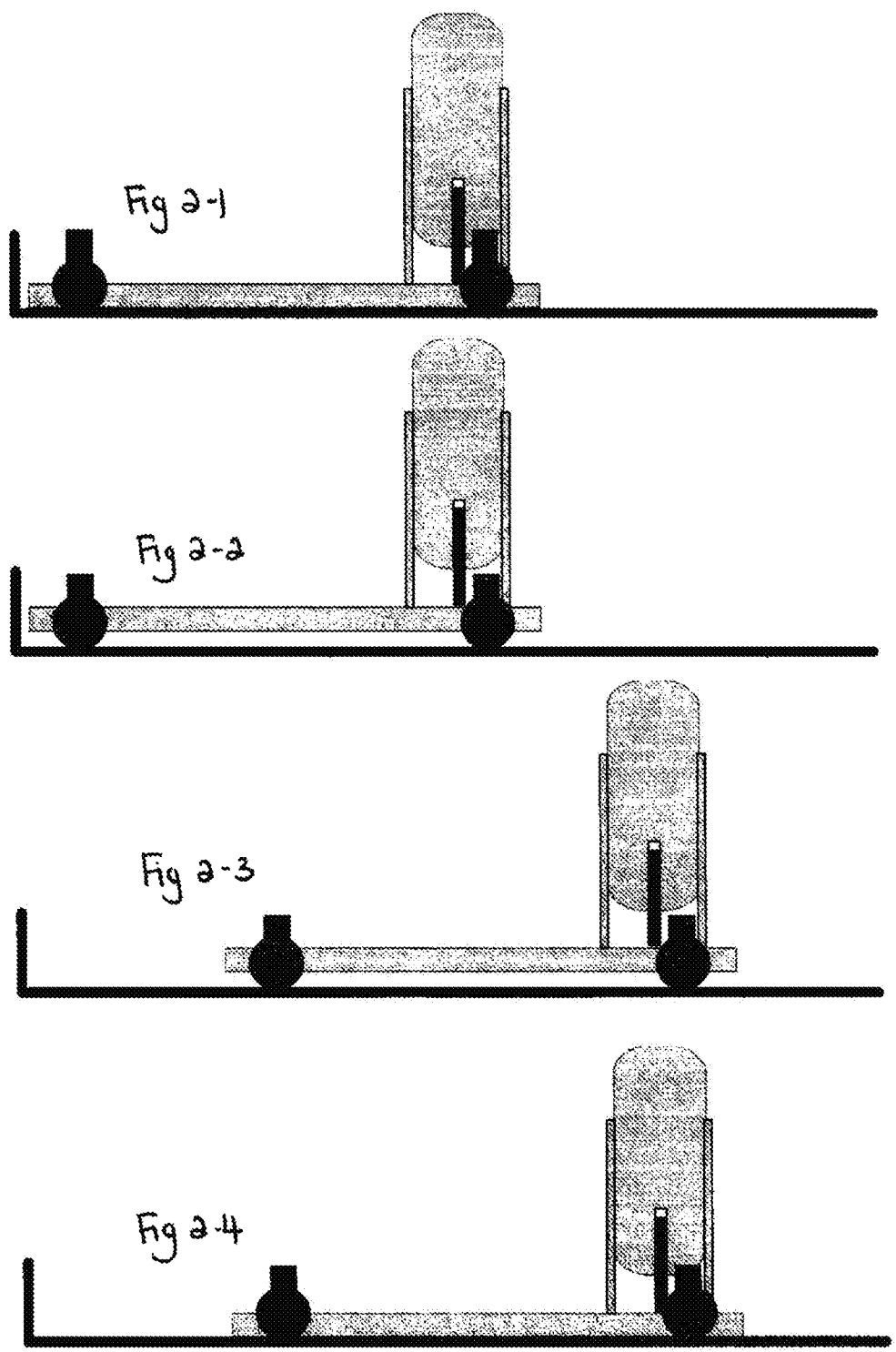

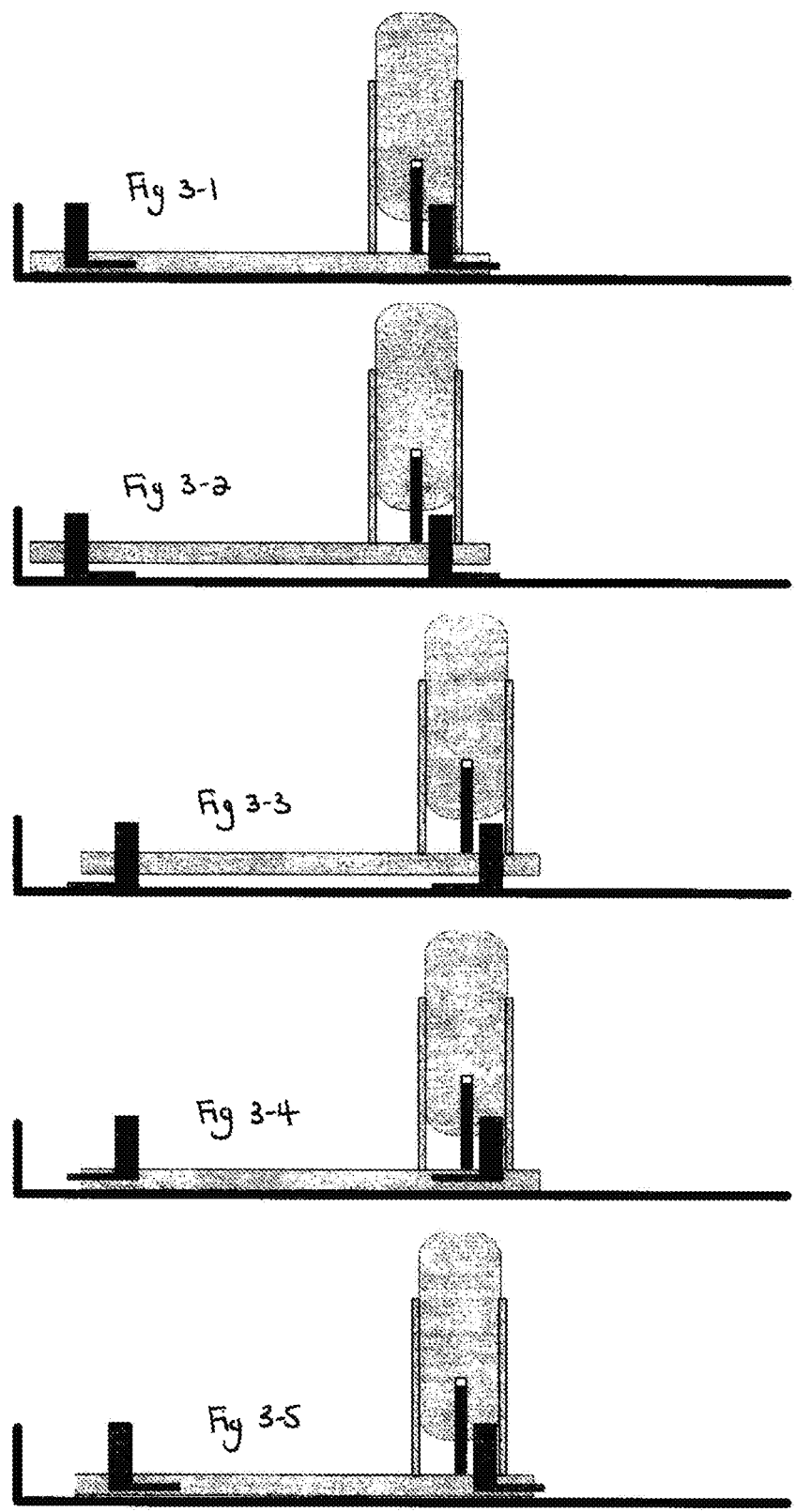

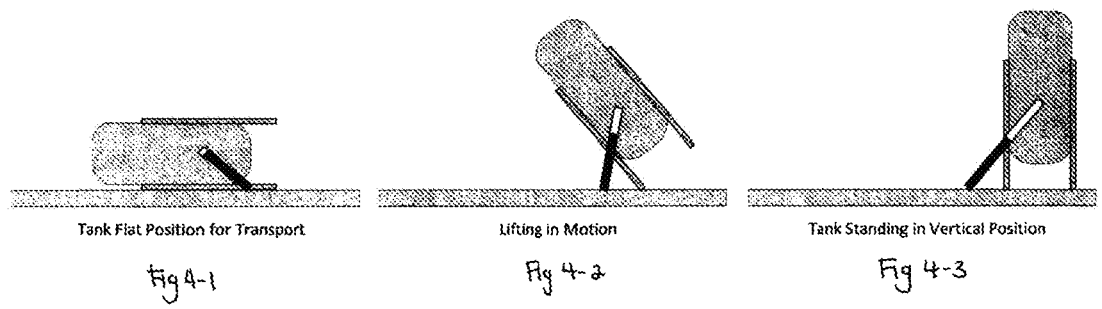
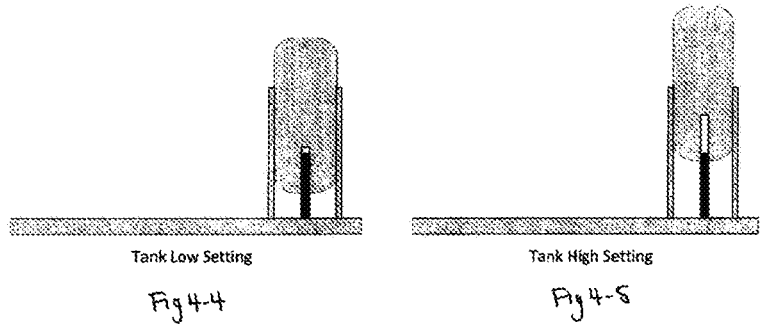

CRANE-FREE WALKING MPD SYSTEM

CROSS REFERENCE TO RELATED APPLICATIONS

This application claims the benefit of Canadian Patent Application No. 2,940,434, filed on Aug. 30, 2016, the disclosure of which is incorporated in its entirety by reference.

FIELD OF THE INVENTION

A Managed Pressure Drilling (MPD) system that does not require the use of any pickers and/or cranes, more specifically an MPD system adapted to be moved as a whole on an oilfield in a minimum amount of time.

BACKGROUND OF THE INVENTION

Recently, oil rigs have been designed to be capable of "walking" from a first location on an oilfield to a second location on the same oilfield. It is not uncommon for an oil rig to drill form 2 to 8 holes on a single pad. While some equipment can be fastened to the rig to be moved over to the next hole usually 15 feet away.

Managed Pressure Drilling is a rather new technique used in oil and gas operations. When drilling for oil and gas, one encounters geological formations that have a narrower tolerance for changes in bottom hole pressure. Using MPD is one solution to this problem. In MPD, the annular space is closed to the atmosphere by means of a Rotating Control Device (RCD). A RCD is a pressure-control device used during drilling for the purpose of making a seal around the drill string during its rotation. The RCD is designed to contain hydrocarbons or other wellbore fluids and prevent their release to the atmosphere. The RCD diverts the fluid into a manifold armed with a specialized choke that allows manipulation of the well's bottom hole pressure. Right before breaking connection to add a new stand, the pumps are ramped down. At the same time, the dynamic component of the bottom hole pressure drops and needs to be compensated for, in order to maintain a near-constant bottom hole pressure.

The MPD system typically comprises a manifold and a tank of compressed gas. The tank and manifold are required to move when the rig is moved because if they did not, the following would be very likely to happen: the primary flow line piping would be longer which increase pressure making drilling more challenging; the U-tube (the pipe that connects the separator tank to the rigs mud tanks) would become very long, this is a safety hazard as it would be a suspended load and it could cause the vessel to plug and spill drilling fluid on ground; and the MPD system would be in the way of the rig's catwalk so that side of the rig would not be usable for pipe or casing which is not an ideal situation.

The current systems available in the industry require pickers to stand separator tanks, flare stacks, pumps and/or generators depending on what models are used.

Even with a "walking" rig, the total time for taking down and setting up a Managed Pressure System can take up to 36 hours. Also, having a system which does not require a picker for setting up and taking down a rig in order to move can save a client upwards of 12 to 16 hours of time depending on the system. This is a very tedious task and can take up to 2 days to move all required Managed Pressure Drilling (MPD) equipment. Current MPD systems without the walking park can be lowered and moved with only the use of a bed truck. It is estimated that a move could be reduced to as little as 4 hours for the entire process. By achieving this, the rigs can begin operation sooner and do not have to wait for the time consuming re-installation of the MPD system. A walking MPD system could even reduce moving time more to as little as 1 hour. This system would also remove the need for bed truck on location saving the client even more.

There are currently trailer mounted flare stacks that can stand themselves. Flare stacks are typically employed to burn off flammable gas released by pressure relief valves during unplanned over-pressuring of equipment. Out in the field, flare stacks require about 5 minutes to stand with the use of hydraulics powered by a 12V battery from a vehicle or other source such as a much smaller generator than those which can be towed with a pickup truck.

Some equipment does not move easily and requires the use of cranes or pickers to move MPD equipment first to the side of location allow the rig to move then reposition into the new spot.

Despite the existing prior art, there still exists a need for a robust, reliable system to displace MPD equipment on an oilfield which allows for faster moving and set up and consequently save time and money.

SUMMARY OF THE PRESENT INVENTION

A MPD system which does not require the use of any pickers and/or cranes to be initially setup or when moved from a first location to a second location on the same oilfield. Current systems used in oilfield operations require pickers to stand separator tanks, flare stacks, pumps and/or generators depending on the models used.

According to a first aspect of the present invention, there is provided a relocatable Managed Pressure Drilling system, said relocatable Managed Pressure Drilling system adapted to be operatively connected to an oil rig and comprising:
  a base;
  a tank secured to the base and adapted to contain gases used in Managed Pressure Drilling operations;
wherein said base being adapted to move from a first location to a second location on an oilfield without the use of a crane or picker.

Preferably, the system further comprises a manifold secured to the base and operatively connected to the tank and adapted for use in Managed Pressure Drilling operations when connected to an oil rig.

More preferably, the tank is equipped with hydraulics and is adapted to move from a horizontal position to a vertical position on said base. Preferably, the tank comprises a stand, said stand comprising an upper extremity secured to the tank and a lower extremity comprising a pivot point connected to the base.

According to a preferred embodiment of the present invention, the base further comprises a walking system adapted to move relocatable managed pressure system from said first location to said second location on the oilfield.

According to a preferred embodiment of the present invention, the walking system comprises:
  a plurality of stomper pads secured to the base; each of said plurality of stomper pads comprising a pair of perpendicular hydraulics: vertical hydraulics and horizontal hydraulics;
wherein the vertical hydraulics are adapted lift the stomper pads off the ground while the base rests on the ground and, while the base is off the ground, the horizontal hydraulics slide the stomper pads form a first proximal position to a second distal position.

According to a preferred embodiment of the present invention, the relocatable Managed Pressure Drilling system further comprises a wheel system secured to the base.

According to a preferred embodiment of the present invention, the relocatable Managed Pressure Drilling system further comprising a cam wheels system adapted to move the relocatable Managed Pressure Drilling system from said first location to said second location on the oilfield.

According to a first aspect of the present invention, there is provided a method of displacing a Managed Pressure Drilling system, said Managed Pressure Drilling system adapted to be operatively connected to an oil rig, said Managed Pressure Drilling system comprising:
   a base;
   a tank secured to the base and adapted to contain gases used in Managed Pressure Drilling operations;
   a manifold secured to the base and operatively connected to the tank and adapted for use in Managed Pressure Drilling operations when connected to an oil rig;
wherein said base being adapted to move from a first location to a second location on an oilfield without the use of a crane or picker.

Preferably, the Managed Pressure Drilling system further comprises a walking system adapted to move relocatable managed pressure system from said first location to said second location on the oilfield.

More preferably, the walking system comprises:
   a plurality of stomper pads secured to the base; each of said plurality of stomper pads comprising a pair of perpendicular hydraulics: vertical hydraulics and horizontal hydraulics;
wherein the vertical hydraulics are adapted lift the stomper pads off the ground while the base rests on the ground and, while the base is off the ground, the horizontal hydraulics slide the stomper pads form a first proximal position to a second distal position.

Preferably, the Managed Pressure Drilling system a wheel system secured to the base and being adapted to be moved from said first location to said second location by being pushed by a forklift or the like.

Preferably also, the Managed Pressure Drilling system comprises a cam wheels system secured to the base and being adapted to allow the base to be moved from said first location to said second location by being pushed by a forklift or the like.

BRIEF DESCRIPTION OF THE FIGURES

The invention may be more completely understood in consideration of the following description of various embodiments of the invention in connection with the accompanying figure, in which:

FIGS. 1-1 to 1-5 illustrate the displacement of a relocatable MPD system equipped with cams according to a preferred embodiment of the present invention;

FIGS. 2-1 to 2-4 illustrate the displacement of a relocatable MPD system equipped with retractable wheels according to a preferred embodiment of the present invention;

FIGS. 3-1 to 3-5 illustrate the displacement of a relocatable MPD system equipped with stomper pads according to a preferred embodiment of the present invention; and FIGS. 4-1 to 4-5 illustrate the displacement of a tank on a relocatable MPD system according to a preferred embodiment of the present invention.

DESCRIPTION OF PREFERRED EMBODIMENTS

According to a preferred embodiment of the present invention, the MPD system which comprises a separator tank, a manifold, as well as the flare stack and any additional accessories associated with the operation of an oil rig which are not mounted on the rig itself do not require the use of a picker/crane. This is due the fact that the flare stack and the MPD tank can be equipped with hydraulics to be moved from a lying horizontal position to a standing vertical position. The rest of equipment can be loaded with a bed truck or moved with forklift or loader on location. If only the MPD equipment has to be moved without an additional walking system the moving time will be reduced to about 6-8 hours.

According to an embodiment of the present invention as illustrated in FIGS. 1-1 to 1-5, the relocatable MPD system uses cams to permit movement of the base off the ground and along a longitudinal path. The lobe design of the cams allows the base to be lifted off the ground while traveling in the desired direction. Benefits of this system include: only one mechanical mechanism rotation; and such does not require the use of loaders or forklifts to be displaced. An engine is preferably located on the base but such is not a strict requirement as several designs using cams or the like can have an engine, batteries or another source of power not located on the base but in proximity thereof.

According to a second preferred embodiment of the present invention and as seen in FIGS. 2-1 to 2-4, the relocatable MPD system is equipped with wheels mounted on hydraulics which allow for the retraction of the wheels off the ground when the MPD system has reached it desired location. A retractable wheel system allows for the skid, once lifted off the ground, to be pushed with a loader or forklift on location to a new desired location. An immediate and obvious benefit of a wheel system is that they may handle uneven surfaces better than stomper pads. As with other embodiments, an engine is can be located on the base but such is not a strict requirement as several designs using this embodiment can have an engine, batteries or other source of power not located on the base but in proximity thereof or be pushed with appropriate equipment available on site.

According to a preferred embodiment of the present invention as illustrated in FIGS. 3-1 to 3-5, the relocatable MPD system uses stomper pads to move from a first location to a second location. Stomper pads are secured to a skid on which is placed a tank equipped with hydraulics to move said tank from a horizontal position to a vertical position for operation. These hydraulics devices allow to lift and slide the tank with the manifold on top still attached. Stomper pads preferably positioned at every corner of the skid or base operate in the following manner. Stomper pads are typically equipped with a pair of perpendicular hydraulics: vertical hydraulics and horizontal hydraulics. While at rest, the base is located at a desired area on an oilfield (see FIG. 3-1). As shown in FIG. 3-2, the vertical hydraulics press the stomper pads on the ground while lifting the skid/base off the ground. As shown in FIG. 3-3, the base is moved in a longitudinal direction by sliding along the horizontal hydraulics carrying the stomper pads form a first proximal position to a second distal position. As shown in FIG. 3-4, once the horizontal hydraulics have finished moving the stomper pads the vertical hydraulics are reapplied to lift the stomper pads off the ground. Once the stomper pads are off the ground, the horizontal hydraulics are actuated again to slide the skid to a distal position and the process start all over again (as shown in FIG. 3-5) until the desired MPD location is reached.

According to another embodiment of the present invention, the relocatable MPD system uses a walking tank. There are no known tanks and manifolds for 'Managed Pressure Drilling' (MPD) that walk with the rig. Some rigs have degassers attached to their rig but they are not a full MPD system they are a single unitary element. Even in those instances the manifold needs to be moved separately which requires many lines to be dismantled prior to moving to the next hole It is estimated that several thousands of dollars are saved by avoiding having a crane or picker on site and about 8-10 hours are saved during each move to the next hole on the same oilfield. Bed trucks or loaders required in this scenario are usually on site. In the event that they are not on site, they are still less than 50% of the cost of having a picker on site.

The embodiments described herein are to be understood to be exemplary and numerous modification and variations of the present invention are possible in light of the above teachings. It is therefore to be understood that within the scope of the claims appended hereto, the invention may be practiced otherwise than as specifically disclosed herein.

The invention claimed is:

1. A relocatable Managed Pressure Drilling system, said relocatable Managed Pressure Drilling system adapted to be operatively connected to an oil rig and comprising:
   a base;
   a tank secured to the base and adapted to contain gases used in Managed Pressure Drilling operations;
   wherein said base is adapted to move from a first location to a second location on an oilfield without the use of a crane or picker; and
      wherein the tank is equipped with hydraulics and is adapted to move from a horizontal position to a vertical position on said base.

2. The relocatable Managed Pressure Drilling system according to claim 1, further comprising a manifold secured to the base and operatively connected to the tank and adapted for use in Managed Pressure Drilling operations when connected to an oil rig.

3. The relocatable Managed Pressure Drilling system according to claim 1, wherein the tank comprises a stand, said stand comprising an upper extremity secured to the tank and a lower extremity comprising a pivot point connected to the base.

4. The relocatable Managed Pressure Drilling system according to claim 1, wherein the base further comprises a walking system adapted to move said relocatable managed pressure system from said first location to said second location on the oilfield.

5. The relocatable Managed Pressure Drilling system according to claim 4, wherein the walking system comprises:
   a plurality of stomper pads secured to the base; each of said plurality of stomper pads comprising a pair of perpendicular hydraulics: vertical hydraulics and horizontal hydraulics;
   wherein the vertical hydraulics are adapted to lift the stomper pads off the ground while the base rests on the ground and, while the base is off the ground, the horizontal hydraulics slide the stomper pads from a first proximal position to a second distal position.

6. The relocatable managed pressure drilling system according to claim 1, further comprising a wheel system secured to the base.

7. The relocatable Managed Pressure Drilling system according to claim 1, further comprising a cam wheels system adapted to move the relocatable Managed Pressure Drilling system from said first location to said second location on the oilfield.

8. A relocatable Managed Pressure Drilling system, said relocatable Managed Pressure Drilling system adapted to be operatively connected to an oil rig and comprising:
   a base;
   a tank secured to the base and adapted to contain gases used in Managed Pressure Drilling operations;
   wherein said base is adapted to move from a first location to a second location on an oilfield without the use of a crane or picker; and
      a cam wheels system adapted to move the relocatable Managed Pressure Drilling system from said first location to said second location on the oilfield.

* * * * *